United States Patent
Ogawa et al.

(10) Patent No.: US 11,401,876 B1
(45) Date of Patent: Aug. 2, 2022

(54) VEHICLE CONTROL SYSTEM

(71) Applicant: Mazda Motor Corporation, Hiroshima (JP)

(72) Inventors: Daisaku Ogawa, Aki-gun (JP); Daisuke Umetsu, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/668,702

(22) Filed: Feb. 10, 2022

(30) Foreign Application Priority Data

Feb. 17, 2021 (JP) .............................. JP2021-023205

(51) Int. Cl.
| | |
|---|---|
| *F02D 41/12* | (2006.01) |
| *B60W 30/045* | (2012.01) |
| *F02D 41/02* | (2006.01) |
| *F02P 5/145* | (2006.01) |
| *B60W 30/18* | (2012.01) |

(52) U.S. Cl.
CPC ........... *F02D 41/12* (2013.01); *B60W 30/045* (2013.01); *B60W 30/18145* (2013.01); *F02D 41/021* (2013.01); *F02P 5/145* (2013.01); *B60W 2520/12* (2013.01); *B60W 2520/14* (2013.01); *B60W 2540/18* (2013.01); *B60W 2710/0666* (2013.01); *F02D 2200/50* (2013.01); *F02D 2250/18* (2013.01)

(58) Field of Classification Search
CPC .... F02D 41/021; F02D 41/12; F02D 2200/50; F02D 2250/18; B60W 30/0445; B60W 30/18145; B60W 2520/14; B60W 2540/18; B60W 2710/0666
See application file for complete search history.

(56) References Cited

U.S. PATENT DOCUMENTS

| | | | | | |
|---|---|---|---|---|---|
| 5,197,008 | A | * | 3/1993 | Itoh | ........................ B60K 28/16 180/197 |
| 5,276,624 | A | * | 1/1994 | Ito | .......................... B62D 15/02 701/72 |
| 2006/0095178 | A1 | * | 5/2006 | Guilfoyle | ............. B60K 11/085 701/1 |

(Continued)

FOREIGN PATENT DOCUMENTS

| | | | |
|---|---|---|---|
| JP | 2019093945 A | * | 6/2019 |
| JP | 2019093945 A | | 6/2019 |

*Primary Examiner* — John M Zaleskas
(74) *Attorney, Agent, or Firm* — Alleman Hall Creasman & Tuttle LLP

(57) ABSTRACT

A control system for a vehicle is provided, which includes a driving force source configured to generate torque for driving drive wheels, a steering angle related value sensor configured to detect a steering angle related value of a steering device of the vehicle, a grille shutter configured to adjust an opening-and-closing degree of an opening formed in a front surface of a vehicle body, and a controller configured to control the torque to control a vehicle attitude based on the steering angle related value. Based on the steering angle related value, when the controller determines that a turning operation of the steering device is performed, it performs a torque decreasing control for reducing the torque to add deceleration to the vehicle, and when the grille shutter opening is large, the controller increases the torque reduction amount in the torque decreasing control more than when the opening is small.

7 Claims, 7 Drawing Sheets

(56) References Cited

U.S. PATENT DOCUMENTS

| | | | | |
|---|---|---|---|---|
| 2009/0105922 | A1* | 4/2009 | Morita | F02D 29/02 |
| | | | | 701/96 |
| 2011/0204149 | A1* | 8/2011 | Prior | B60K 11/085 |
| | | | | 236/35.2 |
| 2013/0110356 | A1* | 5/2013 | Konishi | B62D 37/02 |
| | | | | 701/49 |
| 2015/0147949 | A1* | 5/2015 | Macfarlane | F01P 7/10 |
| | | | | 454/75 |
| 2015/0369147 | A1* | 12/2015 | Itoh | B60W 20/18 |
| | | | | 903/905 |
| 2017/0087986 | A1* | 3/2017 | Ujihara | F02D 41/04 |
| 2017/0089281 | A1* | 3/2017 | Ujihara | B60W 30/045 |
| 2017/0129479 | A1* | 5/2017 | Sunahara | B60W 30/045 |
| 2017/0129480 | A1* | 5/2017 | Sunahara | B60W 30/18145 |
| 2017/0129481 | A1* | 5/2017 | Umetsu | B60W 30/045 |
| 2017/0129482 | A1* | 5/2017 | Sunahara | B60W 30/045 |
| 2017/0145931 | A1* | 5/2017 | Ohisa | F02P 5/145 |
| 2017/0145940 | A1* | 5/2017 | Ohisa | F02D 41/021 |
| 2017/0175659 | A1* | 6/2017 | Sunahara | F02D 41/12 |
| 2017/0234210 | A1* | 8/2017 | Ohisa | F02D 41/0007 |
| | | | | 60/600 |
| 2017/0254278 | A1* | 9/2017 | Ohisa | F02D 41/0002 |
| 2017/0254281 | A1* | 9/2017 | Ohisa | F02D 11/105 |
| 2018/0001888 | A1* | 1/2018 | Takahara | B60W 30/045 |
| 2018/0072317 | A1* | 3/2018 | Hiwatashi | F02D 11/105 |
| 2018/0079406 | A1* | 3/2018 | Izumi | B62D 15/022 |
| 2018/0079407 | A1* | 3/2018 | Izumi | B62D 15/0225 |
| 2018/0086349 | A1* | 3/2018 | Hiwatashi | B60W 10/02 |
| 2018/0265118 | A1* | 9/2018 | Ogawa | B60W 10/10 |
| 2018/0265119 | A1* | 9/2018 | Ogawa | B60W 10/06 |
| 2018/0266345 | A1* | 9/2018 | Ogawa | F02D 41/021 |
| 2018/0266346 | A1* | 9/2018 | Ogawa | F02D 41/021 |
| 2018/0273024 | A1* | 9/2018 | Umetsu | B60W 30/02 |
| 2018/0274459 | A1* | 9/2018 | Hiwatashi | B60W 30/18145 |
| 2018/0274461 | A1* | 9/2018 | Ujihara | B60W 30/045 |
| 2018/0281780 | A1* | 10/2018 | Hiwatashi | B60W 40/114 |
| 2018/0345975 | A1* | 12/2018 | Hiwatashi | F02D 41/021 |
| 2018/0345976 | A1* | 12/2018 | Hiwatashi | F02P 5/15 |
| 2018/0345977 | A1* | 12/2018 | Hiwatashi | F02P 5/045 |
| 2018/0347477 | A1* | 12/2018 | Hiwatashi | F02D 29/02 |
| 2019/0061739 | A1* | 2/2019 | Yoshioka | B60W 30/02 |
| 2019/0077391 | A1* | 3/2019 | Hiwatashi | B60W 30/045 |
| 2019/0084552 | A1* | 3/2019 | Yoshioka | B60W 30/02 |
| 2019/0100210 | A1* | 4/2019 | Imamura | B60K 23/08 |
| 2019/0193723 | A1* | 6/2019 | Sunahara | B60T 8/17555 |
| 2019/0389466 | A1* | 12/2019 | Ogawa | F02D 41/04 |
| 2019/0389469 | A1* | 12/2019 | Ogawa | F02D 41/0002 |
| 2019/0389510 | A1* | 12/2019 | Ogawa | B60W 30/045 |
| 2019/0390612 | A1* | 12/2019 | Ogawa | F02D 41/0087 |
| 2020/0070811 | A1* | 3/2020 | Yoshioka | B60W 30/045 |
| 2020/0070812 | A1* | 3/2020 | Yoshioka | F02D 29/02 |
| 2020/0070813 | A1* | 3/2020 | Ogawa | B60W 30/1882 |
| 2020/0149461 | A1* | 5/2020 | Shidara | F01P 5/043 |
| 2020/0217261 | A1* | 7/2020 | Umetsu | F02D 41/12 |
| 2020/0238823 | A1* | 7/2020 | Imamura | B60W 10/18 |
| 2020/0238995 | A1* | 7/2020 | Imamura | F02D 41/021 |
| 2020/0331461 | A1* | 10/2020 | Imamura | B60W 10/119 |
| 2020/0339107 | A1* | 10/2020 | Ogawa | B60W 10/184 |
| 2020/0369261 | A1* | 11/2020 | Umetsu | B60L 7/14 |
| 2020/0377093 | A1* | 12/2020 | Akiya | B60W 20/15 |
| 2020/0400090 | A1* | 12/2020 | Takayama | F02D 41/3076 |
| 2020/0406873 | A1* | 12/2020 | Sunahara | B60W 10/04 |
| 2020/0406883 | A1* | 12/2020 | Umetsu | B60T 8/1755 |
| 2021/0270333 | A1* | 9/2021 | Ogawa | B60T 8/1755 |

* cited by examiner

VEHICLE CONTROL SYSTEM

TECHNICAL FIELD

The present disclosure relates to a control system for a vehicle, which controls attitude of the vehicle according to steering.

BACKGROUND OF THE DISCLOSURE

Conventionally, a technique is known for controlling the vehicle attitude by causing deceleration or acceleration in the vehicle according to a driver's operation of a steering wheel to improve the response and the stability of the vehicle behavior with respect to the steering operation. For example, when the steering wheel is turned in one direction, the driving force of the vehicle is reduced to add the deceleration. This control increases the load of front wheels corresponding to the turning of the steering wheel, and therefore, the cornering force of the front wheels increases. Thus, the turnability of the vehicle in the early stage of the curve entry improves, and the response and the steering stability for the turning operation of the steering improve.

Meanwhile, for the purpose of improving fuel efficiency, etc., a grille shutter is used to adjust the opening in the front surface of the vehicle to adjust an amount of external air flowing into the engine bay to perform a temperature control for the engine coolant and the lubricant. Here, since the traveling air resistance of the vehicle changes when the grille shutter is opened or closed during the control for the vehicle attitude described above, variation arises in the deceleration of the vehicle, and therefore, the planned vehicle attitude control may not be achieved. Therefore, for example, JP6481745B proposes a control device for the vehicle, which reduces the reduction of the driving force by the vehicle attitude control when the state of the grille shutter changes to increase the traveling air resistance (i.e., when the opening of the grille shutter increases).

In the meantime, when the opening of the grille shutter is changed and the amount of the external air flowing into the engine bay is changed, the pressure inside the engine bay is changed with the change in the traveling air resistance, and therefore, the aerodynamic lift which biases a front part of the vehicle upward changes. As a result, this changes the load of the front wheels and the cornering force changes. However, since the conventional technique such as one disclosed in JP6481745B does not take the change in the lift of the vehicle front part accompanying the change in the opening of the grille shutter into consideration, the response to the turning operation of the steering wheel may not be improved, or the response may be adversely increased excessively. For example, when the opening of the grille shutter is increased, the pressure inside the engine bay increases. Therefore, the lift which acts on the vehicle front part increases, and the load of the front wheels decreases. In this case, according to the technique disclosed in JP6481745B, since the reduction of the driving force by the vehicle attitude control is reduced when the opening of the grille shutter increases, it further decreases the load of the front wheels. As the result, the cornering force of the front wheels decreases, and the improvements in the response or the steering stability for the turning operation of the steering may not be obtained. Thus, according to the conventional technique, by changing the opening of the grille shutter, the response and the steering stability for the turning operation of the steering may change. Therefore, it may cause the driver discomfort.

SUMMARY OF THE DISCLOSURE

The present disclosure is made in view of solving the problems described above, and one purpose thereof is to provide a control system for a vehicle which controls attitude of the vehicle according to steering, capable of achieving response and steering stability which are consistent with operation of a steering wheel, without being influenced by an opening of a grille shutter.

According to one aspect of the present disclosure, a control system for a vehicle is provided, which includes a driving force source configured to generate torque for driving drive wheels of the vehicle, a steering angle related value sensor configured to detect a steering angle related value of a steering device of the vehicle, a grille shutter configured to adjust an opening-and-closing degree of an opening formed in a front surface of a body of the vehicle, and a controller configured to control the torque generated by the driving force source to control a vehicle attitude based on the steering angle related value. When the controller determines that a turning operation of the steering device is performed based on the steering angle related value, the controller performs a torque decreasing control for reducing the torque generated by the driving force source to add deceleration to the vehicle. When the opening of the grille shutter is large, the controller increases the reduction amount of the torque in the torque decreasing control more than when the opening is small.

According to this configuration, although when the opening of the grille shutter increases during the execution of the torque decreasing control, the aerodynamic lift which acts on the front part of the vehicle increases, since the load added to the drive wheel (front wheels) increases by increasing the reduction amount of the torque in the torque decreasing control, it can suppress the change in the cornering power of the front wheels resulting from the change in the opening of the grille shutter. Therefore, the response and the steering stability which are consistent with the operation of the steering device (steering wheel) can be obtained, without being influenced by the opening of the grille shutter.

The grille shutter may be configured to adjust the opening-and-closing degree of the opening up to a fully closed state.

According to this configuration, while preventing an occurrence of discomfort for a driver, a forward deceleration can be promptly applied to the vehicle during the turning operation after a returning operation of the steering wheel is performed and then the steering wheel passes through the neutral position. Therefore, the maneuverability and the stability during the turning operation of the steering wheel after passing the neutral position can be improved to smoothen the behavior of the vehicle.

The steering angle related value may be a steering angle.

According to this configuration, the vehicle attitude can be controlled promptly to improve the response and the stability of the vehicle behavior with respect to the driver's steering operation.

The driving force source may include an internal combustion engine, and the controller controls the torque generated by the internal combustion engine.

According to this configuration, in the vehicle which highly requires the adjustment of the opening of the grille shutter in order to improve the fuel efficiency, etc. of the engine, the response and the steering stability which are consistent with the operation of the steering wheel can be obtained without being influenced by the opening of the grille shutter.

The steering angle related value may be one of a steering angle, a yaw rate, and a lateral acceleration.

DETAILED DESCRIPTION OF THE DISCLOSURE

Hereinafter, a control system for a vehicle according to one embodiment of the present disclosure is described with reference to the accompanying drawings.

<Configuration of Vehicle>

Figure 1:
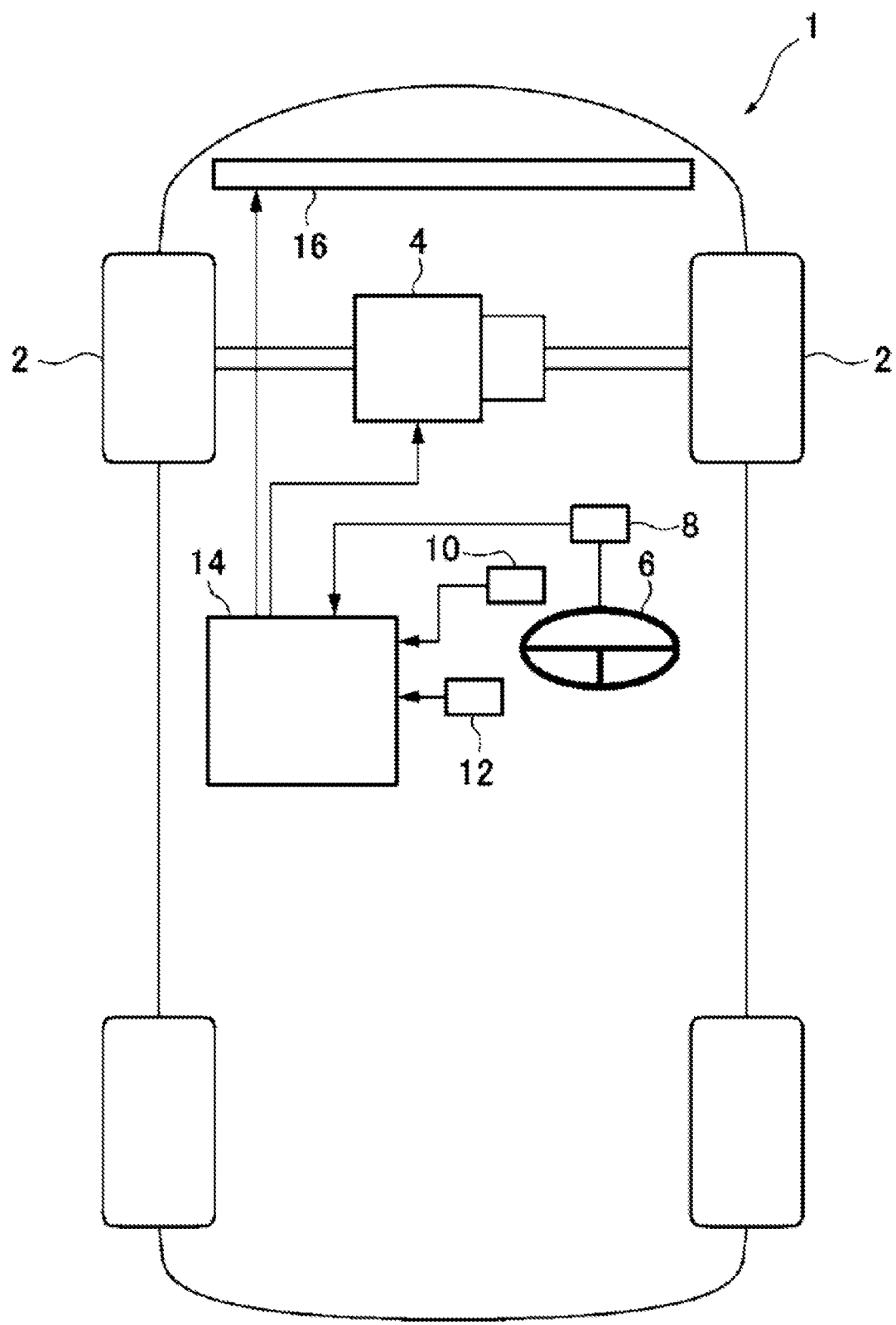
FIG. 1 is a block diagram schematically illustrating the overall configuration of a vehicle according to one embodiment of the present disclosure.
Figure 2:
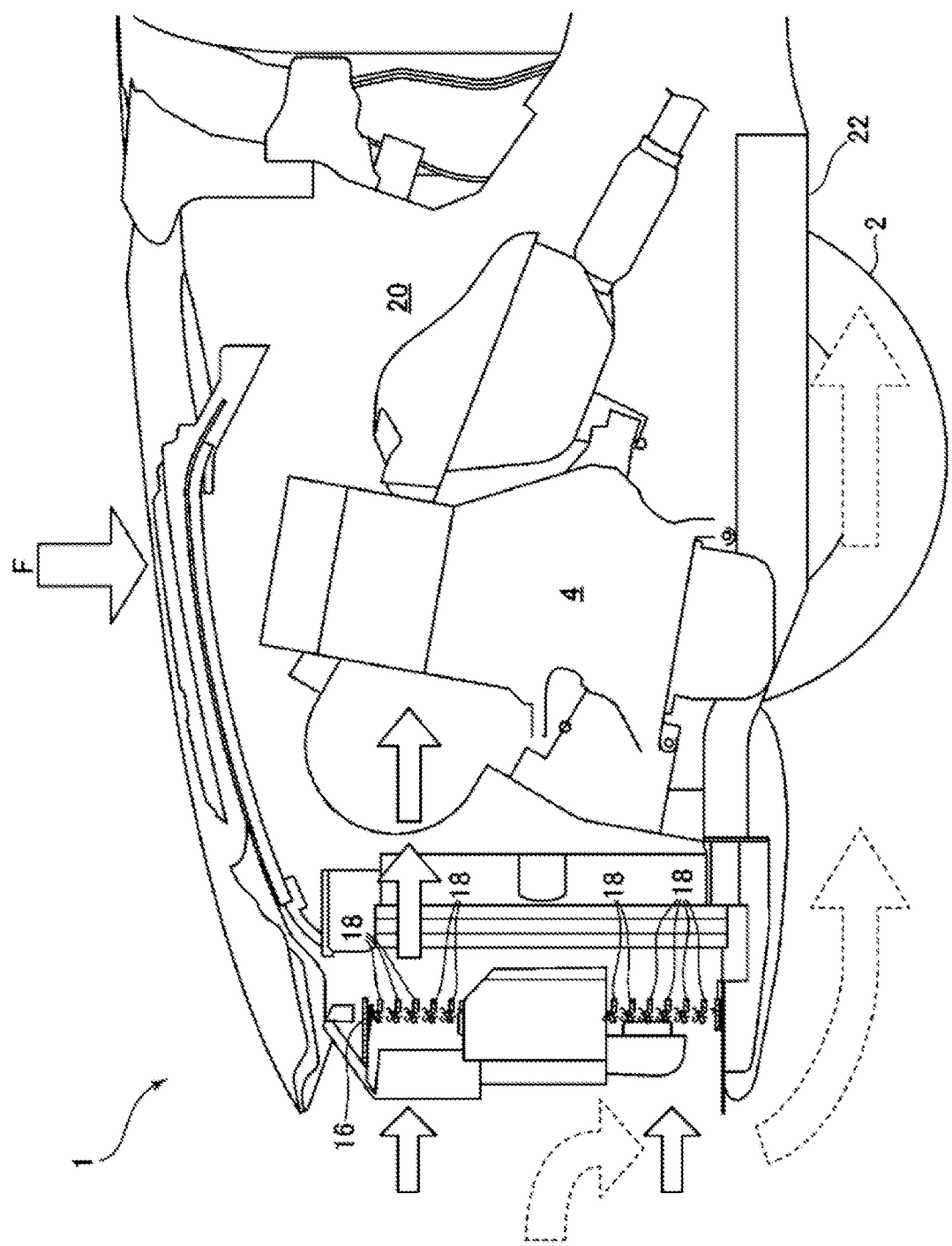
FIG. 2 is a cross-sectional view illustrating a front part of the vehicle mounted with a control device for the vehicle according to this embodiment, when seen from the left side.

First, referring to FIGS. 1 and 2, the vehicle to which the control system for the vehicle according to this embodiment is applied is described. FIG. 1 is a block diagram schematically illustrating the overall configuration of the vehicle according to this embodiment, and FIG. 2 is a cross-sectional view illustrating a front part of the vehicle mounted with the control device for the vehicle according to this embodiment, when seen from the left side.

As illustrated in FIG. 1, an engine 4 is mounted on a front part of a vehicle 1, as a motor (driving force source) which drives left and right front wheels 2 which are drive wheels. The engine 4 is an internal combustion engine, such as a gasoline engine or a diesel engine, and in this embodiment, it is a gasoline engine having a throttle valve 26, a spark plug 28, a variable valve mechanism 30, and a fuel injection device 32. This vehicle 1 is configured as a so-called "front-engine, front-wheel drive (FF) vehicle."

The vehicle 1 includes a steering device (a steering wheel 6, etc.) for steering the vehicle 1, a steering angle sensor 8 which detects a turning angle of a steering column (not illustrated) coupled to the steering wheel 6 in this steering device, a gyroscope 34 which detects a yaw rate of the vehicle 1 (see FIG. 4), an accelerometer 36 which detects a lateral acceleration of the vehicle (see FIG. 4), an accelerator opening sensor 10 which detects an accelerator opening equivalent to a stepping amount of an accelerator pedal, and a vehicle speed sensor 12 which detects a traveling speed of the vehicle 1. Note that the steering angle sensor 8 may detect various properties in the steering system (a rotation angle of a motor which applies assisting torque, a displacement of a rack in a rack-and-pinion mechanism), and a steered angle (tire angle) of the front wheels 2, as the steering angle, instead of the turning angle of the steering wheel 6. Each sensor outputs the detection values to a controller 14. This controller 14 is comprised of a PCM (Power-train Control Module), for example.

The vehicle 1 is provided with a grille shutter 16 (an air inflow adjustment mechanism, an opening-and-closing device) which opens and closes an opening formed in a front surface of the vehicle body. As illustrated in FIG. 2, the grille shutter 16 is provided to an opening formed in front of the engine 4, in the front surface of the vehicle 1. The grille shutter 16 is provided with a plurality of elongated plate-like fins 18 extending in the vehicle width direction. Each fin 18 is rotatable between an orientation in which its plate surface is parallel to the front-and-rear direction of the vehicle 1 and an orientation in which its plate surface is perpendicular to the front-and-rear direction of the vehicle 1. In detail, when the orientation of the fins 18 is parallel to the front-and-rear direction of the vehicle 1 (illustrated by solid lines in FIG. 2), the opening of the grille shutter 16 becomes a maximum opening, and a flow rate of air which passes through the grille shutter 16 from the front of the vehicle 1 and enters into an engine bay 20 becomes a maximum air flow (illustrated by solid-line arrows in FIG. 2). In this case, the pressure inside the engine bay 20 rises and the aerodynamic lift which biases the front part of the vehicle 1 upward increases.

On the other hand, when the orientation of the fins 18 is perpendicular to the front-and-rear direction of the vehicle 1 (illustrated by broken lines in FIG. 2), the opening of the grille shutter 16 becomes a minimum opening, and the flow of air which passes through the grille shutter 16 from the front of the vehicle 1 and enters into the engine bay 20 is intercepted. Therefore, the lift accompanying the pressure increase inside the engine bay 20 is suppressed. Further, by reducing the opening of the grille shutter 16, the flow rate of air which flows underneath the vehicle 1 (illustrated by broken-line arrows in FIG. 2) increases, and a flow velocity of the air which flows underneath a floor 22 increases. In this case, the pressure underneath the floor 22 decreases and a downforce F which downwardly biases the front part of the vehicle 1 increases.

Figure 3:
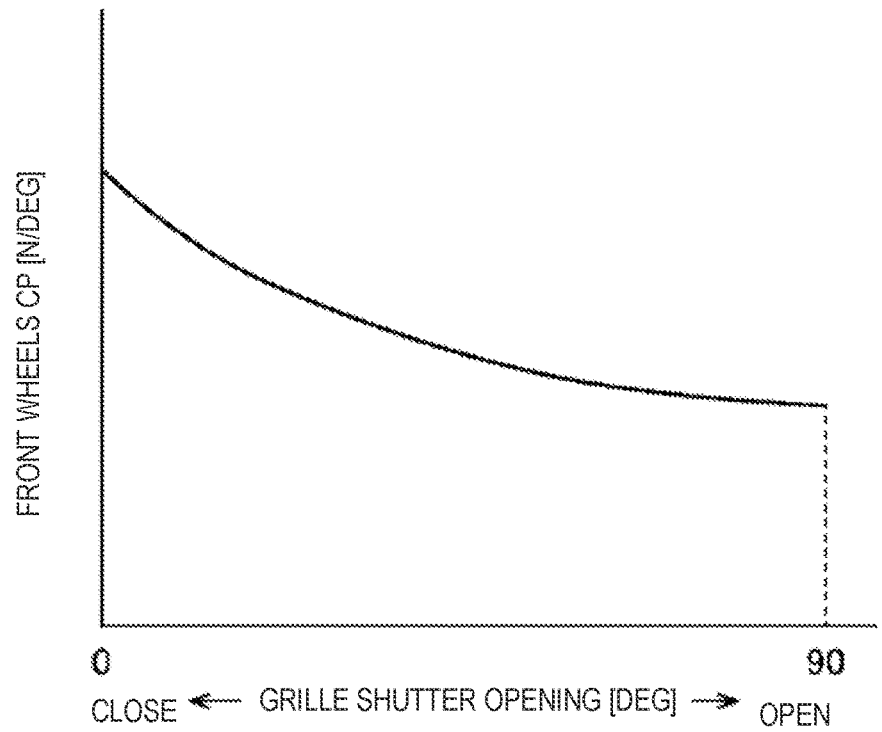
FIG. 3 is a diagram illustrating a relationship between an opening of a grille shutter and a cornering power of front wheels.

As described above, by changing the opening of the grille shutter 16, the lift or downforce F which acts on the front part of the vehicle 1 changes. As a result, since the grounding load of the front wheels 2 changes, the cornering power changes. Referring to FIG. 3, a relationship between the opening of the grille shutter 16 and the cornering power of the front wheels 2 is described. FIG. 3 is a diagram illustrating a relationship between the opening of the grille shutter 16 and the cornering power of the front wheel 2, when changing the opening of the grille shutter 16 from fully closed to fully open under a condition of constant traveling speed.

In FIG. 3, the horizontal axis indicates the opening (deg) of the grille shutter 16. Here, the opening when the fins 18 of the grille shutter 16 are oriented perpendicular to the front-and-rear direction of the vehicle 1 (i.e., fully close) is 0°, and the opening when the fins 18 are oriented horizontal to the front-and-rear direction of the vehicle 1 (i.e., fully open) is 90°. Further, in FIG. 3, the vertical axis indicates the cornering power (CP) (N/deg) of the front wheels 2.

As illustrated in FIG. 3, since the downforce F which downwardly biases the front part of the vehicle 1 becomes a maximum force when the opening of the grille shutter 16 is 0° (i.e., fully closed), the cornering power of the front wheels 2 becomes a maximum power. Then, as the opening of the grille shutter 16 increases, the downforce F which acts on the front part of the vehicle 1 decreases, and the lift accompanying the pressure increase inside the engine bay 20 increases. Therefore, the cornering power of the front wheels 2 decreases, and when the opening of the grille shutter 16 is 90° (i.e., fully open), the cornering power becomes a minimum power. That is, the response of the behavior of the vehicle 1 to the operation of the steering wheel 6 tends to fall as the opening of the grille shutter 16 increases.

Figure 4:
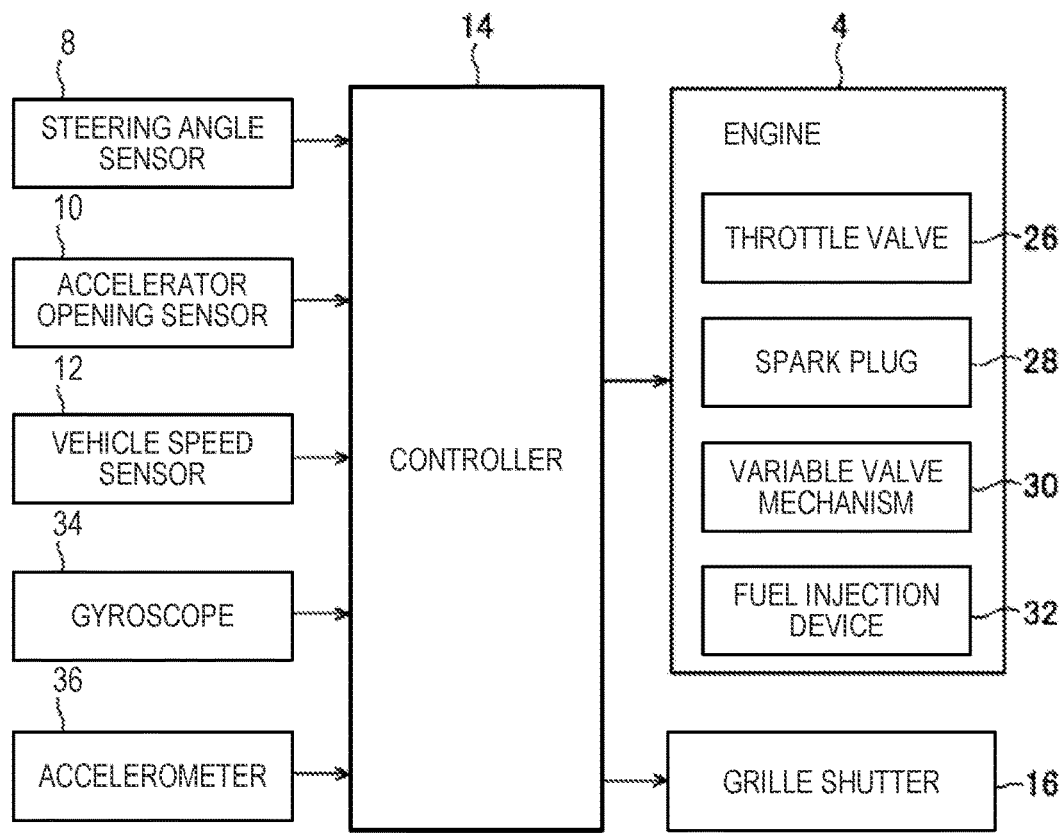
FIG. 4 is a block diagram illustrating an electric configuration of the vehicle according to this embodiment.

Next, referring to FIG. 4, an electric configuration of a control device for the vehicle according to this embodiment of the present disclosure is described. FIG. 4 is a block diagram illustrating the electric configuration of the control device for the vehicle according to this embodiment.

As illustrated in FIG. 4, based on detection signals outputted from various sensors which detect the operating state of the vehicle 1, in addition to detection signals from the sensors 8, 10, 12, 34, and 36 described above, the controller 14 outputs a control signal to perform a control of each part of the engine 4 (for example, the throttle valve 26, the spark plug 28, the variable valve mechanism 30, the fuel injection valve 32, etc.) and the grille shutter 16.

The controller 14 is comprised of a circuitry and is a controller based on a well-known microcomputer. The controller 14 includes one or more microprocessors as a CPU (Central Processing Unit) which executes a program, memory which is comprised of, for example, RAM (Random Access Memory) and/or ROM (Read Only Memory), and stores the program and data, an input/output bus which performs input/output of an electric signal. Note that the system including the steering wheel 6, the steering angle sensor 8, and the controller 14 is an example of a "control system for a vehicle" in the present disclosure.

<Vehicle Attitude Control>

Below, a vehicle attitude control according to this embodiment of the present disclosure is described. Fundamentally, in this embodiment, the controller 14 controls vehicle attitude (vehicle behavior) based on the steering angle detected by the steering angle sensor 8. In detail, when the steering wheel 6 is turned in one direction so that it separates from the neutral position (i.e., when the steering angle increases), the controller 14 performs a torque decreasing control to reduce torque generated by the engine 4 so that a deceleration is added to the vehicle 1 (i.e., deceleration to decelerate the vehicle 1 which moves forward). By performing such a torque decreasing control, it can improve the turnability and the steering stability of the vehicle 1 when entering into a corner.

Note that, below, torque which is applied to the torque decreasing control, i.e., a negative torque which is added to the torque generated by the engine 4 in order to add the deceleration to the vehicle 1 is referred to as the "reducing torque." In the torque decreasing control, the reducing torque is subtracted from the torque to be generated by the engine 4 (hereinafter, referred to as the "basic torque") in order to achieve the acceleration according to the operating state of the vehicle 1 (accelerator opening, etc.). Below, the torque after the reducing torque is thus subtracted (i.e., the torque to be finally generated by the engine 4) is referred to as the "final target torque" with respect to the basic torque.

Figure 5:
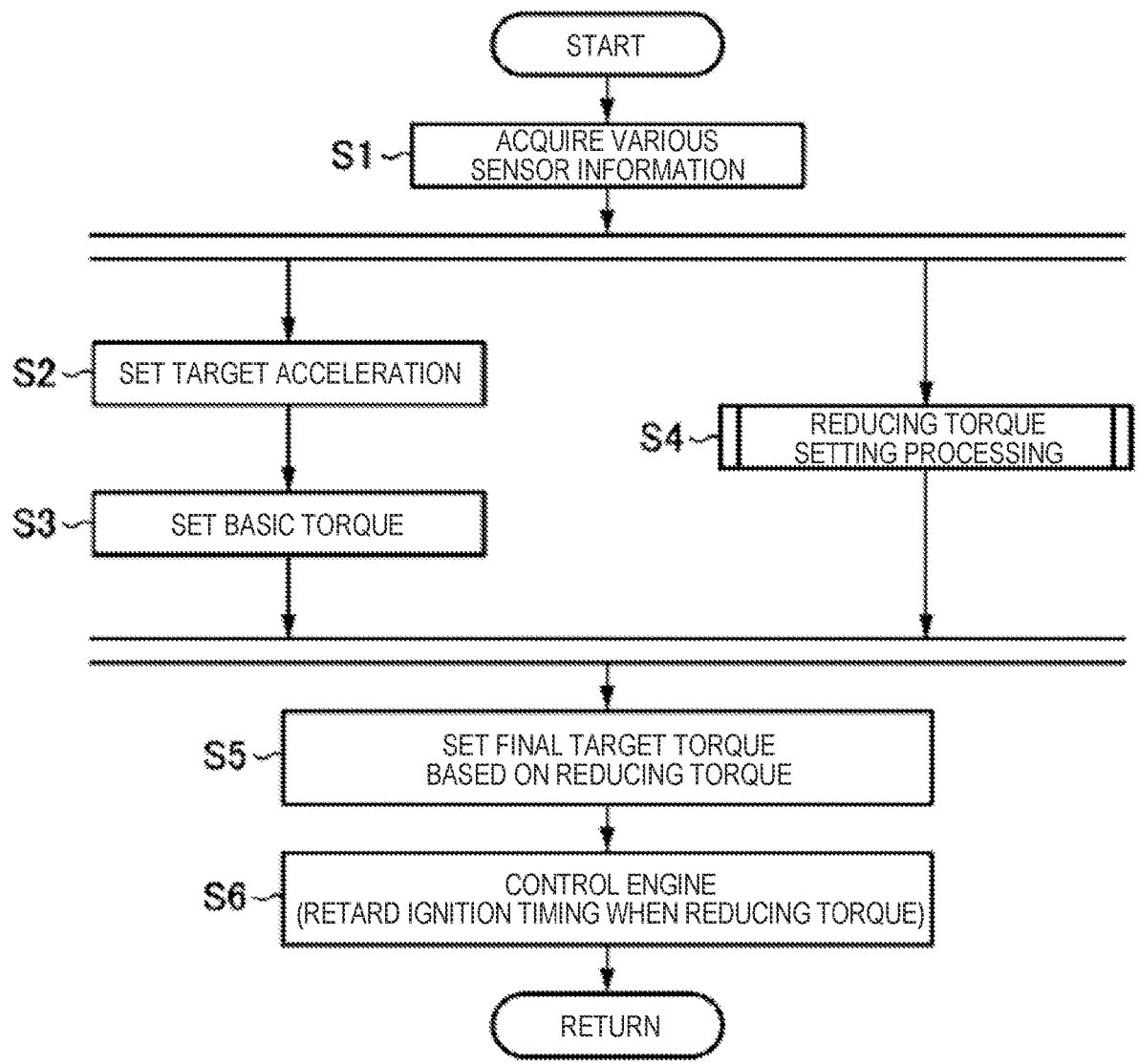
FIG. 5 is a flowchart of a torque decreasing control processing according to this embodiment.

Next, referring to FIG. 5, the overall flow of the torque decreasing control according to this embodiment of the present disclosure is described. FIG. 5 is a flowchart of the torque decreasing control processing according to this embodiment.

The torque decreasing control processing in FIG. 5 is started when the ignition of the vehicle 1 is turned ON and the power is supplied to the controller 14, and it is repeatedly performed at a given period (for example, 50 ms). As the torque decreasing control processing is started, at Step S1, the controller 14 acquires various sensor information on the operating state of the vehicle 1. In detail, the controller 14 acquires, as the information on the operating state, the detection signals outputted from the various sensors including the steering angle detected by the steering angle sensor 8, the accelerator opening detected by the accelerator opening sensor 10, the traveling speed detected by the vehicle speed sensor 12, and the current opening of the grille shutter 16.

Next, at Step S2, the controller 14 sets a target acceleration based on the operating state of the vehicle 1 acquired at Step S1. In detail, for example, the controller 14 selects an acceleration characteristics map corresponding to the current traveling speed and the current gear stage from acceleration characteristics maps which are defined for various traveling speeds and various gear stages (created beforehand and stored in the memory, etc.), and sets the target acceleration corresponding to the current accelerator opening with reference to the selected acceleration characteristics map.

Next, at Step S3, the controller 14 sets the basic torque of the engine 4 for achieving the target acceleration set at Step S2. In this case, the controller 14 sets the basic torque within a range of torque which the engine 4 is possible to the output, based on the current traveling speed, the current gear stage, the road surface gradient, the road surface $\mu$, etc.

Further, at Step S4, in parallel to the processing at Steps S2 and S3, the controller 14 performs the reducing torque setting processing which will be described later (see FIG. 6), and based on the steering speed, etc. of the steering wheel 6, it sets the reducing torque to be applied to the torque generated by the engine 4 in order to control the vehicle attitude.

Next, at Step S5 after Steps S2 to S4, the controller 14 sets the final target torque based on the basic torque set at Step S3 and the reducing torque set at Step S4. Fundamentally, the controller 14 calculates the final target torque by subtracting the reducing torque from the basic torque.

Next, at Step S6, the controller 14 controls the engine 4 to output the final target torque set at Step S5. In detail, the controller 14 determines, based on the final target torque set at Step S5 and the engine speed, various properties (for example, an air filling amount, a fuel injection amount, an intake air temperature, an oxygen concentration, etc.) which are required for achieving the final target torque, and based on the properties, controls actuators which drive the respective components of the engine 4. In this case, the controller 14 sets a limit value and a limit area according to the properties, and sets such a controlled variable for each actuator that the properties complies the limit value and the limit area and performs the control.

In more detail, the controller 14 reduces the torque generated by the engine 4 by retarding the ignition timing of the spark plug 28 from the ignition timing at which the basic torque is set to the final target torque as it is at Step S5. Note that, when the engine 4 is a diesel engine, the controller 14 can reduce the torque generated by the engine 4 by reducing a fuel injection amount from the fuel injection amount at which the basic torque is set to the final target torque as it is at Step S5. After Step S6, the controller 14 ends the torque decreasing control processing.

Figure 6:
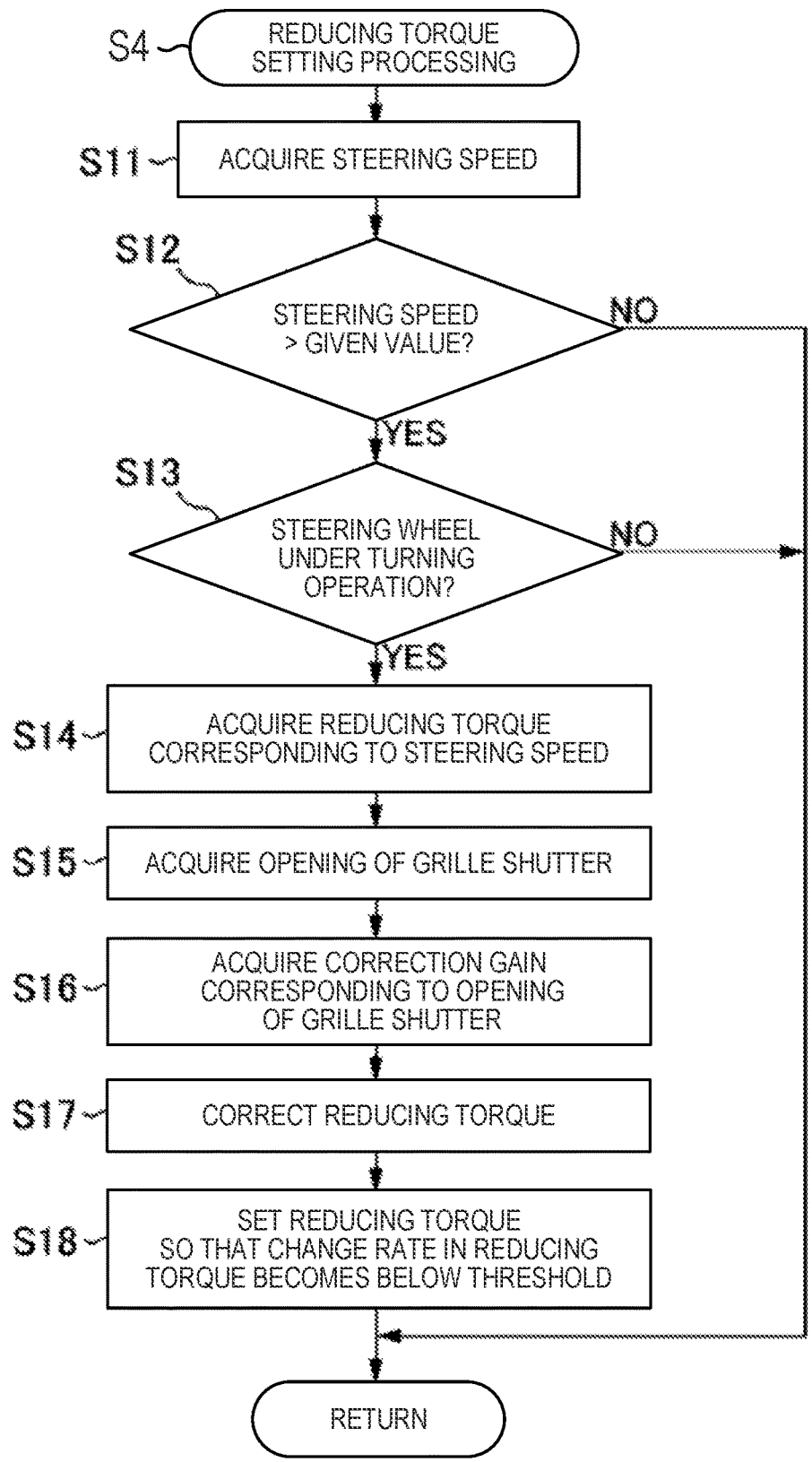
FIG. 6 is a flowchart of a reducing torque setting processing according to this embodiment.

Next, referring to FIG. 6, the reducing torque setting processing according to this embodiment of the present disclosure is described. FIG. 6 is a flowchart of the reducing torque setting processing according to this embodiment. This reducing torque setting processing is performed at Step S4 of the torque decreasing control processing illustrated in FIG. 5.

When the reducing torque setting processing is started, at Step S11, the controller 14 acquires the steering speed based on the steering angle acquired from the steering angle sensor 8 at Step S1 of the torque decreasing control processing illustrated in FIG. 5. Next, at Step S12, the controller 14 determines whether the steering speed acquired at Step S11 is above a given value. As a result, if determined that the steering speed is above the given value (Step S12: YES), the controller 14 shifts to Step S13.

On the other hand, if not determined that the steering speed is above the given value (Step S12: NO), the controller 14 ends the reducing torque setting processing, and returns to the main routine. In this case, the reducing torque becomes 0, and the basic torque set at Step S3 of the torque decreasing control processing illustrated in FIG. 5 becomes the final target torque.

Next, at Step S13, the controller 14 determines whether the steering wheel 6 is under the turning operation. In detail, for example, when an absolute value of the steering angle acquired from the steering angle sensor 8 is increasing (i.e., when the steering angle of the steering wheel 6 is separating from the neutral position), the controller 14 determines that the steering wheel 6 is under the turning operation. On the other hand, for example, when the absolute value of the steering angle acquired from the steering angle sensor 8 is decreasing (i.e., when the steering angle of the steering wheel 6 is approaching the neutral position), the controller 14 determines that the steering wheel 6 is under a returning operation (that is, it is not under the turning operation). As a result, when the controller 14 determines that the steering wheel 6 is under the turning operation (Step S13: YES), it shifts to Step S14.

Figure 7:
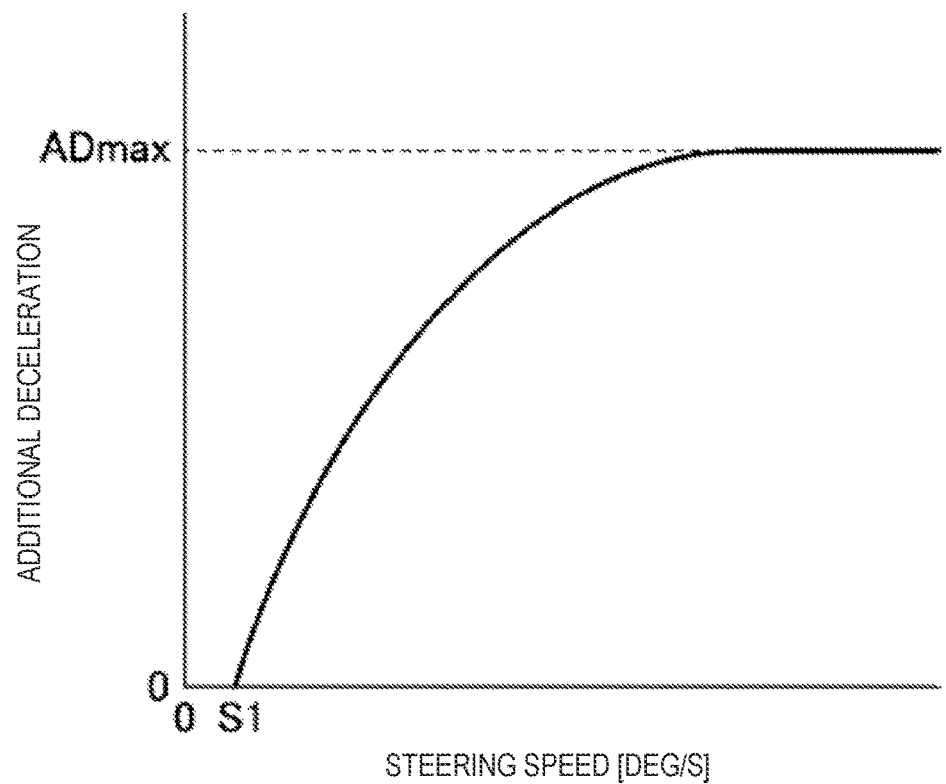
FIG. 7 is a map illustrating a relationship between a steering speed and an additional deceleration according to this embodiment.

Next, at Step S14, the controller 14 acquires the reducing torque based on the steering speed. In detail, before acquiring the reducing torque, the controller 14 first sets the additional deceleration corresponding to the current steering speed based on the relationship between the steering speed and the additional deceleration as illustrated in the map of FIG. 7. This additional deceleration is a forward deceleration to be added to the vehicle 1 according to the steering operation in order to control the vehicle attitude in accordance with the driver's intention of the turning operation of the steering wheel 6. In FIG. 7, the horizontal axis indicates the steering speed, and the vertical axis indicates the additional deceleration. As illustrated in FIG. 7, when the steering speed is below a threshold S1, the additional deceleration is 0. When the steering speed exceeds the threshold S1, the additional deceleration corresponding to this steering speed gradually approaches a given upper limit $AD_{max}$ as the steering speed increases. That is, as the steering speed increases, the additional deceleration increases, and an increasing rate of the amount of increase becomes smaller. This upper limit $AD_{max}$ is set to such a deceleration that, even if the deceleration is added to the vehicle 1 according to the steering operation, the driver does not sense a control intervention (for example, 0.5 m/s² 0.05

G). Further, when the steering speed becomes above the given value, the additional deceleration is maintained at the upper limit $AD_{max}$. Then, the controller 14 acquires the reducing torque based on the additional deceleration set in this way. In detail, the controller 14 determines the reducing torque required for achieving the additional deceleration by the reduction of the basic torque, based on the current traveling speed, gear stage, road surface gradient, etc.

Next, at Step S15, the controller 14 acquires the opening of the grille shutter 16. The opening of the grille shutter 16 can be acquired, for example, from an instructed value outputted from controller 14 to the actuator which operates the fins 18, a rotational position of the actuator, etc.

Next, at Step S16, the controller 14 acquires a correction gain for correcting the reducing torque according to the opening of the grille shutter 16. In detail, the controller 14 acquires the correction gain corresponding to the current opening of the grille shutter 16 based on the relationship between the opening of the grille shutter 16 and the correction gain illustrated in the map of FIG. 8.

Figure 8:
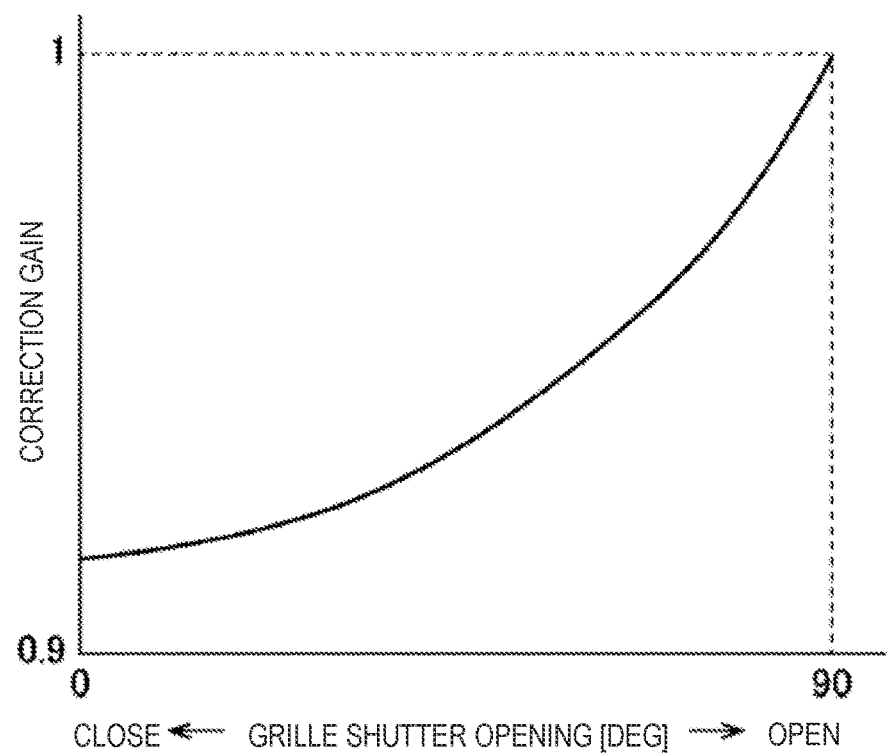
FIG. 8 is a map illustrating a relationship between the opening of the grille shutter and a correction gain to the reducing torque according to this embodiment.

In FIG. 8, the horizontal axis indicates the opening of the grille shutter 16, and the vertical axis indicates the correction gain. As illustrated in FIG. 8, when the opening of the grille shutter 16 is 0° (i.e., fully closed), the correction gain is the minimum (about 0.92 in the example of FIG. 8). The correction gain corresponding to the opening of the grille shutter 16 increases as the opening of the grille shutter 16 approaches 90° (that is, the opening of the grille shutter 16 becomes larger). When the opening of the grille shutter 16 is 90° (i.e., fully open), the correction gain becomes 1. The rate of change in the correction gain according to the change in the opening of the grille shutter 16 (a slope of the graph illustrated in FIG. 8) becomes smaller as the opening of the grille shutter 16 approaches 0°.

As described with reference to FIG. 3, as the opening of the grille shutter 16 increases, the downforce F which acts on the front part of the vehicle 1 decreases, and the lift accompanying the pressure increase inside the engine bay 20 increases. Therefore, the cornering power of the front wheels 2 tends to decrease and the response of the behavior of the vehicle 1 to the operation of the steering wheel 6 tends to decrease. Thus, as illustrated in FIG. 8, the correction gain is set so that, as the opening of the grille shutter 16 becomes larger, the reducing torque increases and the deceleration added to the vehicle 1 by the torque decreasing control increases (that is, the load added to the front wheels 2 increases and the cornering power increases).

Next, at Step S17, the controller 14 corrects the reducing torque acquired at Step S14 by using the correction gain acquired at Step S16. In detail, the controller 14 multiplies the reducing torque acquired at Step S14 by the correction gain acquired at Step S16. By correcting in this way, the reducing torque increases as the opening of the grille shutter 16 becomes larger.

Next, at Step S18, the controller 14 sets the reducing torque in this processing cycle so that a rate of change in the reducing torque becomes below a threshold, based on the reducing torque corrected at Step S17 and the threshold (defined beforehand and stored in the memory, etc.) which defines an upper limit of the rate of change in the reducing torque. After Step S18, the controller 14 ends the reducing torque setting processing, and returns to the main routine. In this case, at Step S5 of the torque decreasing control processing in FIG. 5, the controller 14 sets the final target torque based on the basic torque set at Step S3 and the reducing torque set at Step S18.

Further, at Step S13, if the controller 14 determines that the steering wheel 6 is not under the turning operating (Step S13: NO), in detail, for example, if the absolute value of the steering angle acquired from the steering angle sensor 8 is decreasing (i.e., if the steering angle of the steering wheel 6 is approaching the neutral position), the controller 14 ends the reducing torque setting processing, and returns to the main routine. In this case, the reducing torque becomes 0, and the basic torque set at Step S3 of the torque decreasing control processing illustrated in FIG. 5 becomes the final target torque.

<Operation and Effects>

Figure 9:
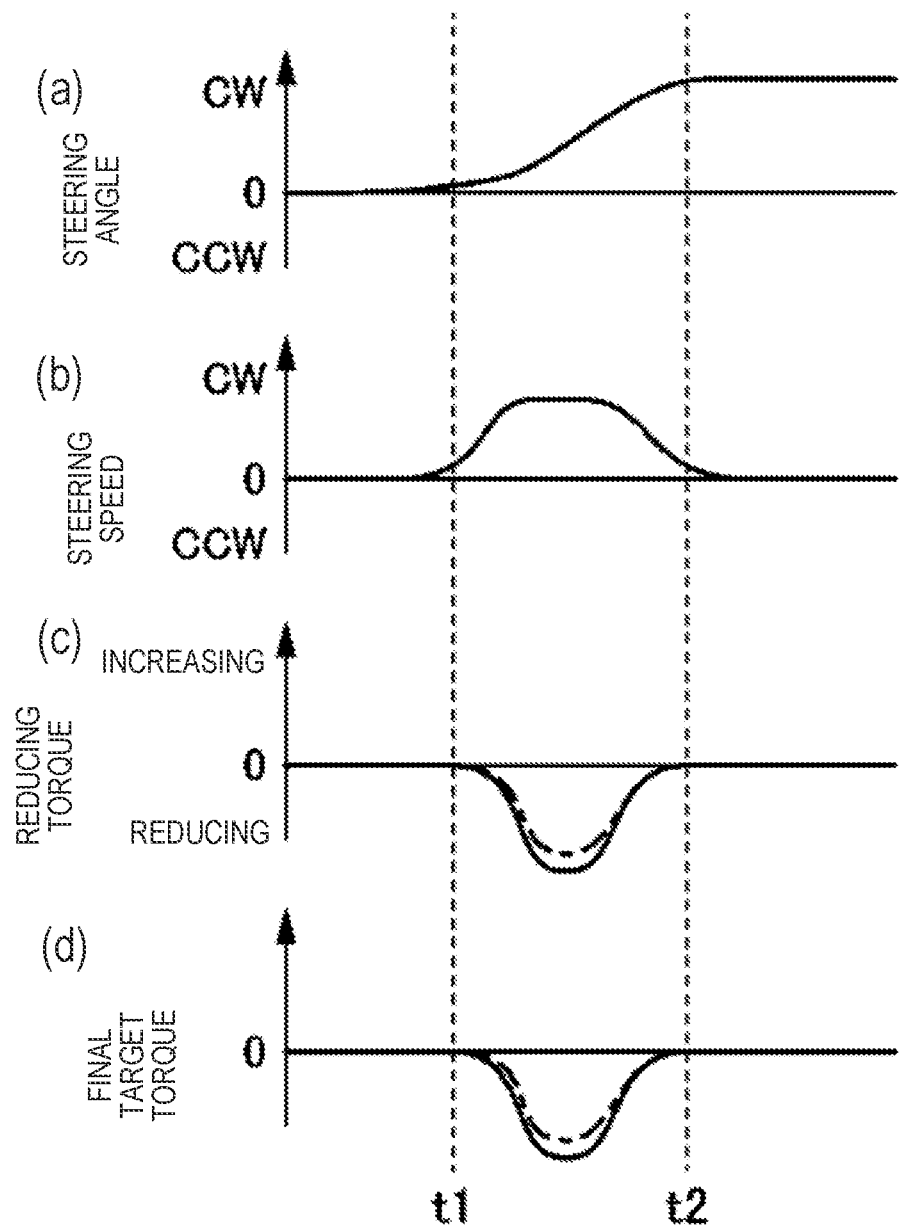
FIG. 9 is a time chart when performing the torque decreasing control according to this embodiment.

Next, operation and effects of the control system for the vehicle according to this embodiment of the present disclosure are described with reference to the time chart in FIG. 9. FIG. 9 is a time chart when performing the torque decreasing control according to this embodiment. In FIG. 9, the horizontal axis indicates time. Further, the vertical axis indicates (a) the steering angle, (b) the steering speed, (c) the reducing torque, and (d) the final target torque, sequentially from the top. In the graphs (c) and (d) of FIG. 9, solid lines indicate changes in the reducing torque and the final target torque when the opening of the grille shutter 16 is 90° (fully open) (that is, when the correction gain is 1), and one-dot chain lines indicate changes in the reducing torque and the final target torque when applying the correction gain at which the opening of the grille shutter 16 is 0° (fully closed) to the reducing torque.

As illustrated in the graph (a) of FIG. 9, it illustrates a case where the steering wheel 6 is first turned clockwise (CW) from the neutral position, and the rotational position of the steering wheel 6 is then held at a certain steering angle.

In connection with the turning operation of the steering wheel 6 in the clockwise (CW) direction from the neutral position being started, the steering speed (absolute value) in the CW direction increases. When the steering speed becomes above the threshold S1 at time t1, the controller 14 sets the reducing torque based on the steering speed so as to add the deceleration to the vehicle 1, and performs the torque decreasing control for reducing the torque generated by the engine 4. Then, while the steering speed increases, the controller 14 increases the reducing torque (absolute value) according to the steering speed, and when the steering speed becomes constant, it maintains the reducing torque. Further, when the steering speed decreases, the controller 14 decreases the reducing torque (absolute value) in accordance therewith.

Then, when the steering speed becomes below the threshold S1 at time t2 by the steering wheel 6 being held at the turned state, the controller 14 ends the torque decreasing control and the reducing torque becomes 0. That is, the deceleration added to the vehicle 1 becomes 0.

The controller 14 applies the correction gain according to the opening of the grille shutter 16 to the reducing torque, and performs the torque decreasing control by the corrected reducing torque. As described above, the correction gain corresponding to the opening of the grille shutter 16 is set so that it becomes larger as the opening of the grille shutter 16 increases. Therefore, the controller 14 increases the reducing torque (absolute value) when the opening of the grille shutter 16 is large (for example, when the opening of the grille shutter 16 is 90° (fully open), as illustrated by the solid line in the graph (c) of FIG. 9) more than when the opening of the grille shutter 16 is small (for example, when the opening of the grille shutter 16 is 0° (fully closed), as illustrated by the one-dot chain line in the graph (c) of FIG. 9). Therefore, when the opening of the grille shutter 16 is large, the deceleration added to the vehicle 1 by the torque decreasing control increases more than when the opening is small. That is, the load added to the front wheels 2 by the torque decreasing control increases.

Thus, in this embodiment, the controller 14 performs the torque decreasing control so as to add the deceleration to the vehicle 1 when it determines that the turning operation of the steering wheel 6 is performed based on the steering angle, and it increases the reduction amount of the torque in the torque decreasing control when the opening of the grille shutter 16 is large more than when the opening is small. When the opening of the grille shutter 16 increases during the execution of the torque decreasing control, the lift which acts on the front part of the vehicle 1 increases. However, since the load added to the front wheels 2 increases by increasing the reduction amount of the torque in the torque decreasing control, it can suppress the change in the cornering power of the front wheels 2 resulting from the change in the opening of the grille shutter 16. Therefore, the response and the steering stability which are consistent with the operation of the steering wheel 6 can be obtained, without being influenced by the opening of the grille shutter 16.

Further, in this embodiment, the grille shutter 16 is adjustable in the opening-and-closing degree of the opening up to the fully closed state. When the opening of the grille shutter 16 is fully closed, the lift accompanying the pressure increase inside the engine bay 20 is suppressed, and the downforce F for downwardly biasing the front part of the vehicle 1 increases.

However, by reducing the reduction amount of the torque in the torque decreasing control accordingly, the load added to the front wheels 2 becomes smaller. Thus, it can suppress the change in the cornering power of the front wheels 2 resulting from the change in the opening of the grille shutter 16.

Further, since in this embodiment the controller 14 sets the reducing torque at least based on the steering angle detected by the steering angle sensor 8, it can control the vehicle attitude promptly to improve the response and the stability of the vehicle behavior with respect to the driver's steering operation.

Moreover, in this embodiment, the driving force source of the vehicle 1 is the engine 4 and the controller 14 controls the torque generated by the engine 4. Therefore, in the vehicle which highly requires the adjustment of the opening of the grille shutter 16 in order to improve the fuel efficiency, etc. of the engine 4, the response and the steering stability which are consistent with the operation of the steering wheel 6 can be obtained, without being influenced by the opening of the grille shutter 16.

<Modifications>

Although in the above embodiment the present disclosure is applied to the vehicle 1 having the internal combustion engine as the driving force source, the present disclosure may also be applied to a vehicle having an electric motor as the driving force source. In this case, for example, current supplied to the electric motor from an inverter may be controlled in order to achieve the reducing torque in the torque decreasing control.

Further, in the above embodiment, the controller 14 performs the torque decreasing control at least based on the steering angle detected by the steering angle sensor 8. However, instead of or in addition to the steering angle, the torque decreasing control may be performed based on the operating state of the vehicle 1 other than the operation of the accelerator pedal (a lateral acceleration, a yaw rate, a slip ratio, etc.). For example, the vehicle 1 may be provided with a yaw rate sensor (e.g., gyroscope 34) which detects the yaw rate of the vehicle 1 and an acceleration sensor (e.g., accelerometer 36) which detects the acceleration of the vehicle 1. The controller 14 may perform the torque decreasing control based on a steering angle related value, such as the yaw rate detected by the yaw rate sensor or the lateral acceleration detected by the acceleration sensor, instead of the steering angle. Each of the steering angle, the yaw rate, and the lateral acceleration is one example of a "steering angle related value" in the present disclosure.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Vehicle
2 Wheel
4 Engine
6 Steering Wheel
8 Steering Angle Sensor
10 Accelerator Opening Sensor
12 Vehicle Speed Sensor
14 Controller
16 Grille Shutter

What is claimed is:

1. A control system for a vehicle, the control system comprising:
   a driving force source configured to generate torque for driving drive wheels of the vehicle;
   a steering angle related value sensor configured to detect a steering angle related value of a steering device of the vehicle;
   a grille shutter configured to adjust an opening-and-closing degree of an opening formed in a front surface of a body of the vehicle; and
   a controller configured to control the torque generated by the driving force source to control a vehicle attitude based on the steering angle related value,
   wherein, when the controller determines that a turning operation of the steering device is performed based on the steering angle related value, the controller performs a torque decreasing control that reduces the torque generated by the driving force source to add deceleration to the vehicle, and when the opening of the grille shutter is large, the controller increases the reduction amount of the torque in the torque decreasing control more than when the opening is small.

2. The control system of claim 1, wherein the grille shutter is configured to adjust the opening-and-closing degree of the opening up to a fully closed state.

3. The control system of claim 2, wherein the steering angle related value is a steering angle.

4. The control system of claim 3, wherein the driving force source includes an internal combustion engine, and the controller controls the torque generated by the internal combustion engine.

5. The control system of claim 1, wherein the steering angle related value is a steering angle.

6. The control system of claim 1, wherein the driving force source includes an internal combustion engine, and the controller controls the torque generated by the internal combustion engine.

7. The control system of claim 1, wherein the steering angle related value is one of a steering angle, a yaw rate, and a lateral acceleration.

* * * * *